United States Patent
Liao et al.

(10) Patent No.: US 8,422,083 B2
(45) Date of Patent: Apr. 16, 2013

(54) CALIBRATION MECHANISM AND SCANNER HAS THE CALIBRATION MECHANISM

(75) Inventors: Wen-Ching Liao, Taipei (TW); Lung Chen, Taipei (TW); Chin-Te Liu, Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 476 days.

(21) Appl. No.: 12/831,264

(22) Filed: Jul. 7, 2010

(65) Prior Publication Data

US 2012/0008175 A1    Jan. 12, 2012

(51) Int. Cl.
*H04N 1/04* (2006.01)

(52) U.S. Cl.
USPC ............ 358/461; 358/496; 358/406; 358/474

(58) Field of Classification Search .................. 358/461, 358/496, 498, 474, 406, 504; 399/367
See application file for complete search history.

(56) References Cited

U.S. PATENT DOCUMENTS

| | | | | |
|---|---|---|---|---|
| 4,970,606 A | * | 11/1990 | Shima | 358/474 |
| 5,125,047 A | * | 6/1992 | Ito et al. | 382/321 |
| 5,130,807 A | * | 7/1992 | Tanabe et al. | 358/296 |
| 5,329,378 A | * | 7/1994 | Lee | 358/406 |
| 6,989,915 B2 | * | 1/2006 | Honjo et al. | 358/461 |
| 7,327,502 B2 | * | 2/2008 | Sheng | 358/498 |
| 7,379,216 B2 | * | 5/2008 | Yang | 358/461 |
| 7,545,544 B2 | * | 6/2009 | Tanaka et al. | 358/496 |
| 7,808,680 B2 | * | 10/2010 | Lee | 358/461 |
| 8,320,026 B2 | * | 11/2012 | Tanaka | 358/461 |
| 2011/0109945 A1 | * | 5/2011 | Tsukahara | 358/461 |

* cited by examiner

*Primary Examiner* — Cheukfan Lee
(74) *Attorney, Agent, or Firm* — Lin & Associates IP, Inc

(57) ABSTRACT

A calibration mechanism is positioned in a scanning device having a scanning module for scanning a document. The scanning module defines a scanning line perpendicular to a scanned area of the document. The calibration mechanism includes a calibration unit, a supporting unit supporting the calibration unit, and a driving unit. The calibration unit is positioned to face the scanning module and aligned with the scanning line. The driving unit drives the calibration unit to move close to the scanning module and away from the scanning module along the scanning line. The scanning module obtains great brightness value by scanning the calibration unit, if the calibration unit is close to the scanning module. The scanning module obtains small brightness value by scanning the calibration unit, if the calibration unit is far from the scanning module.

9 Claims, 5 Drawing Sheets

| Distance | Red (R) | Green (G) | Blue (B) |
|---|---|---|---|
| 10 mm | 56 | 101 | 90 |
| 11.25 mm | 48 | 88 | 79 |
| 12.5 mm | 41 | 78 | 72 |
| 13.75 mm | 34 | 64 | 63 |
| 15 mm | 26 | 51 | 51 |
| 16.25 mm | 20 | 41 | 41 |
| 17.5 mm | 12 | 26 | 33 |
| 18.75 mm | 12 | 18 | 20 |

FIG. 5

CALIBRATION MECHANISM AND SCANNER HAS THE CALIBRATION MECHANISM

BACKGROUND OF THE INVENTION

1. Field of the Invention

The present invention relates to a calibration mechanism positioned in a scanner, more specifically, to a calibration mechanism capable of alternating the background color and the gray scale and a scanner having the calibration mechanism.

2. The Related Art

In an auto document feeding scanner, a scanning module is fixed for scanning a movable document conveyed by rollers. A calibration sheet positioned to face the scanning module is used to adjust the shade value of the scanning module and to a background. Conventionally, if the scanned document is a light color paper such as a white paper, then the calibration sheet must be manually replaced as a dark color paper such as a black paper. If the scanned document is a dark color paper such as a black paper, then the calibration sheet must be manually replaced as a light color paper such as a white paper.

Therefore, users can enhance the de-skew function and the document edge detection function if the contrast between the scanned document and the calibration sheet is strong enough. Furthermore, the calibration sheet can be manually replaced as a gray sheet for adjusting the shade value of the scanning module.

However, it is inconvenient to manually replace the different calibration sheets and store the different calibration sheets. Moreover, it is easy to contaminate the calibration by human's finger's gripping. The quality of the scanned image, the de-skew function and the document edge detection function will be degraded if the scanning module scans the dirty calibration sheets.

SUMMARY OF THE INVENTION

An object of the present invention is to provide a calibration mechanism capable of alternating the background color and the gray scale.

According to the invention, the calibration mechanism is positioned in a scanning device having a scanning module for scanning a document. The scanning module defines a scanning line perpendicular to a scanned area of the document. The calibration mechanism includes a supporting unit, a calibration unit and a driving unit. The calibration unit is connected to the supporting unit. The calibration unit is positioned to face the scanning module and aligned with the scanning line. The driving unit drives the calibration unit to move close to the scanning module and away from the scanning module along the scanning line.

Another object of the present invention is to provide a scanning device has the calibration mechanism.

According to the invention, the scanning device for scanning the document includes the scanning module, the calibration unit, the supporting unit, the driving unit. The scanning module defines a scanning line substantially perpendicular to the scanned area of the document. The calibration unit is positioned to face the scanning module and aligned with the scanning line. The supporting unit supports the calibration unit. The driving unit drives the calibration unit to move close to the scanning module and away from the scanning module along the scanning line.

If the calibration mechanism is moved to close to the scanning module, the scanning module will obtain great brightness value by scanning the calibration unit. The calibration unit of the calibration mechanism is represented as a white sheet. If the calibration mechanism is moved away from the scanning module, the scanning module will obtain small brightness value by scanning the calibration unit. The calibration unit of the calibration mechanism is represented as a gray sheet or a black sheet.

Therefore, the calibration mechanism is capable of alternating the background color and the gray scale by adjusting the distance between the calibration mechanism and the scanning module for adjusting the shade value of the scanning module.

BRIEF DESCRIPTION OF THE DRAWINGS

The present invention will be apparent to those skilled in the art by reading the following description of preferred embodiments thereof, with reference to the attached drawings, in which:

FIG. 5 shows a table relate to the distance between the calibration mechanism and the scanning module and the brightness of Red, Green and Blue color.

DETAILED DESCRIPTION OF THE PREFERRED EMBODIMENT

Figure 1:
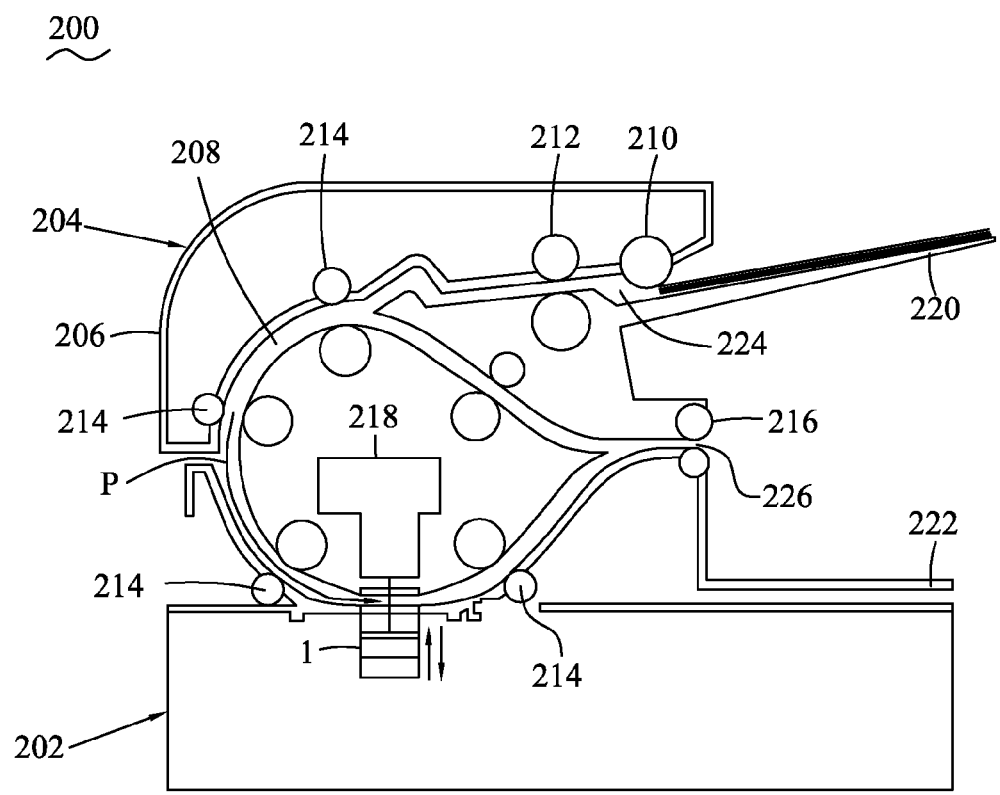
FIG. 1 shows a calibration mechanism mounted in a scanner according to the present invention.
Figure 2:
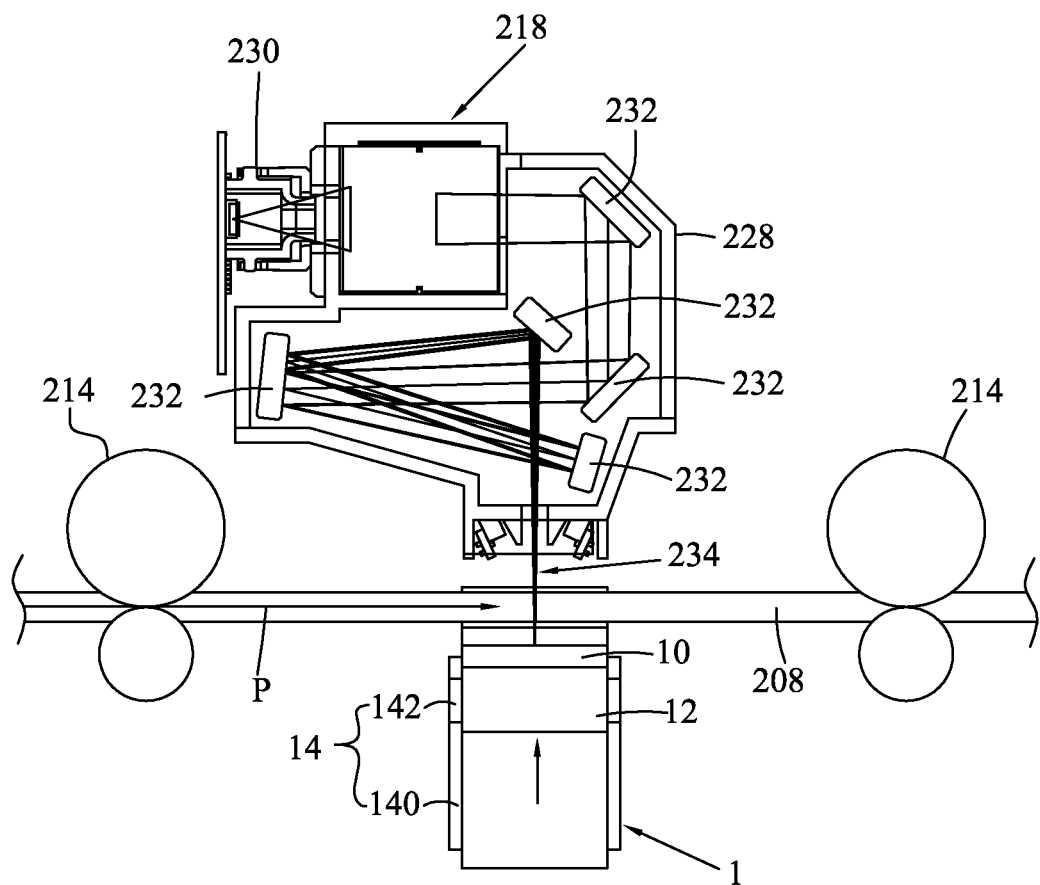
FIG. 2 shows the calibration mechanism slid close to the scanning module according to the present invention.
Figure 3:
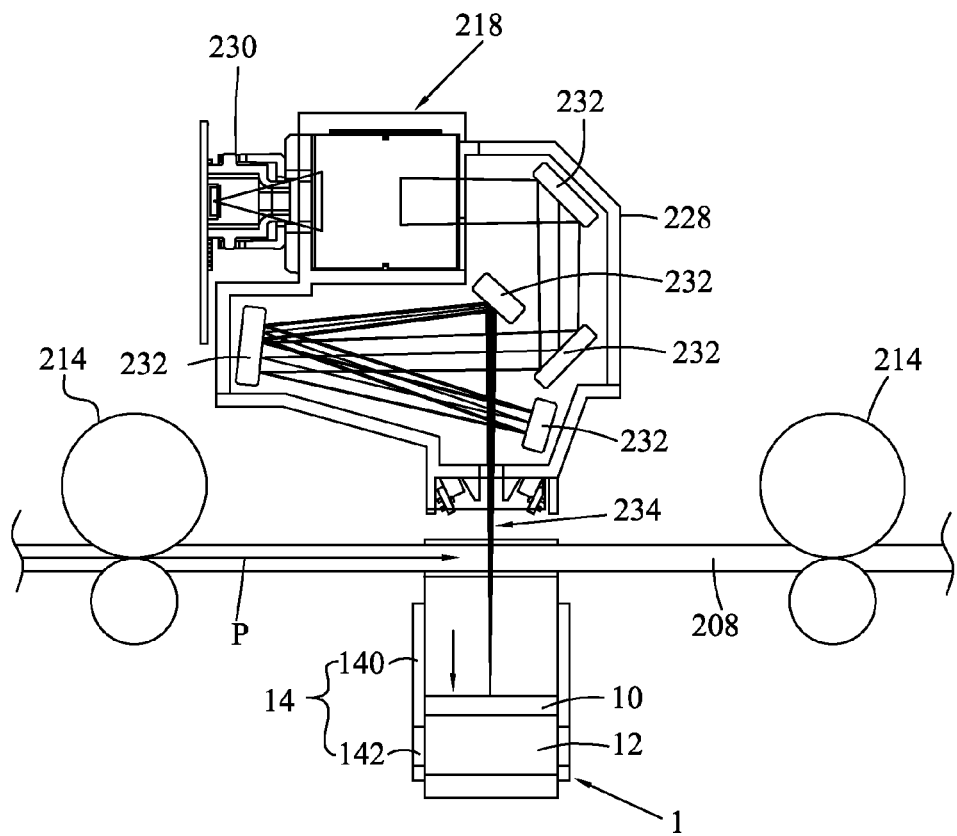
FIG. 3 shows the calibration mechanism slid away from the scanning module according to the present invention.

Please refer to FIG. 1 to FIG. 3. A calibration mechanism 1 is mounted in a scanner 200. The scanner 200 includes a base 202 and an auto document feeder 204 mounted on the base 202. The auto document feeder 204 includes a case 206, a document conveying path 208, a picking up module 210, a separating module 212, a plurality of conveying rollers 214, a discharging module 216, a scanning module 218, an input tray 220 and an output tray 222. The document conveying path 208 is formed in the case 206 and includes an upper stream section 224 and a lower stream opening section 226 respectively connected to the outside of the case 206.

The input tray 220 is connected to the case 206 and positioned close to the upper stream section 224 for receiving a bundle of documents. The output tray 222 is connected to the case 206 and positioned below the input tray 220 and close to the lower stream section 226 for receiving the scanned documents.

The picking up module 210 is positioned at the upper stream section 224 for picking up a document P from the input tray 220 and then conveying the document P into the document conveying path 208. The separating module 212 is positioned in the document conveying path 208 and at a lower stream position relative to the picking up module 210. The separating module 212 includes a driving roller and a driven roller for separating the overlapped documents and conveying a single document P. Especially, the driven roller can be replaced by a separating pad.

The conveying rollers 214 are dispersed along the document conveying path 208 for conveying the document P from the upper stream to the lower stream thereof. The discharging module 216 is positioned at the lower stream section 226 for discharging the document P from the document conveying path 208. Therefore, the discharged document P will be put on the output tray 222.

The scanning module 218 is positioned in the case 206 of the auto document feeder 204 and beside the document conveying path 208. The scanning module 218 includes a module case 228, an optical sensor 230, a plurality of reflective plates 232. The optical sensor 230 is fixed to the module case 228. The reflective plates 232 are positioned in the case module 228.

The scanning module 218 defines a scanning line 234 which is substantially perpendicular to the scanned area of the document P. The calibration mechanism 1 is positioned beside the document conveying path 208. Especially, the calibration mechanism faces the scanning module 218 and is aligned with the scanning line 234 of the scanning module 218.

The calibration mechanism 1 positioned in the base 202 includes a calibration unit 10, a supporting unit 12 and a driving unit 14. The calibration unit 10 is connected to the supporting unit 12 and aligned with the scanning line 234 of the scanning module 218. Especially, the calibration unit 10 is a white sheet.

The driving unit 14 includes a sliding channel 142 formed in the base 202 and a sliding rib 140 connected to the supporting unit 12 and sliding in the sliding channel 142. The extending direction of the sliding channel 142 is parallel to the scanning line 234. The sliding direction of the driving unit 14 is parallel to the scanning line 234 of the scanning module 218. Therefore, the calibration unit 10 connected to the supporting unit 12 can slide far away from and close to the scanning unit 218 along the scanning line 234.

Figure 4:
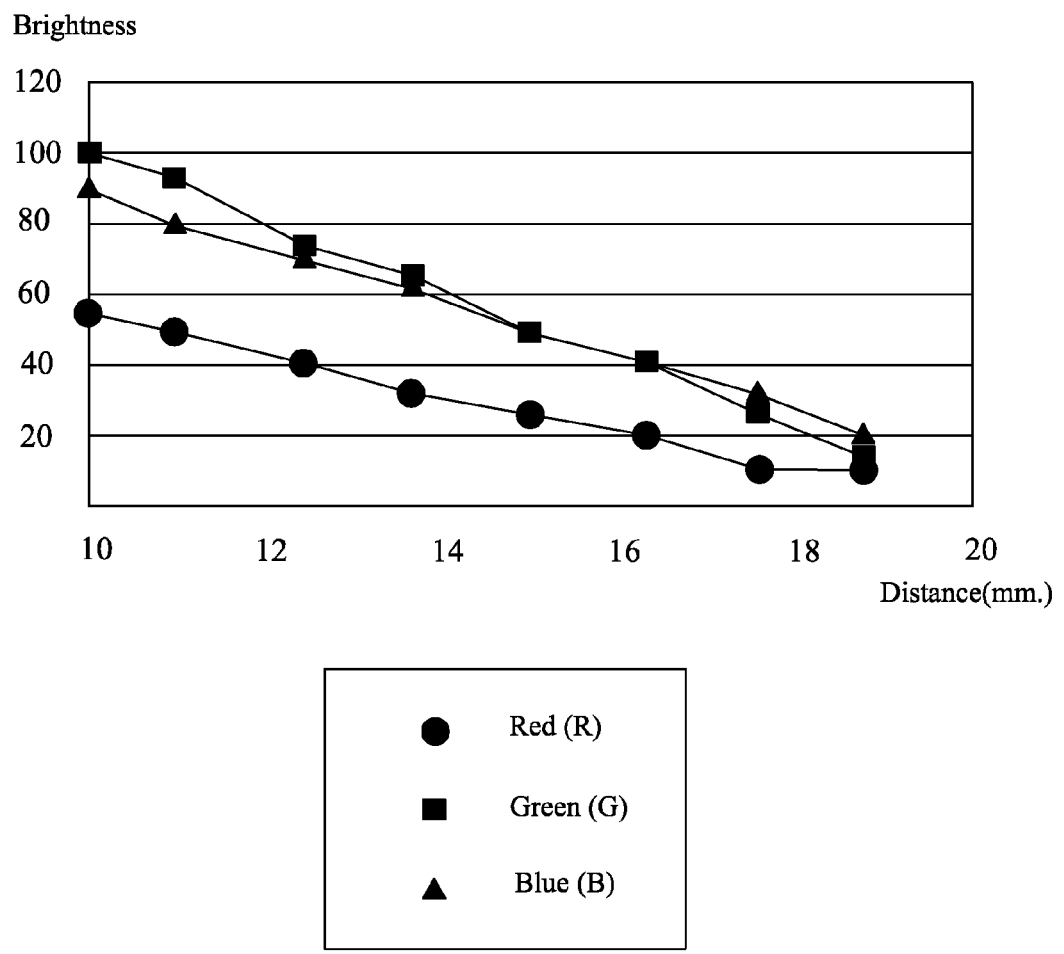
FIG. 4 shows a curve line relate to a distance between the calibration mechanism and the scanning module and a sensed brightness of the scanning module.

Please refer to FIG. 4 and FIG. 5. If the scanning module 218 is calibrated to adjust the shade value thereof, the calibration mechanism 1 will slide close to the scanning module 218 and then the scanning module 218 scanning the calibration unit 10 of calibration mechanism 1. Because the calibration unit 10 is white sheet and the distance between the calibration unit 10 and the scanning module is 10 millimeters, the scanning module 218 can obtain the brightness value of the red color, the green color and the blue color respectively 56, 101, 90.

Because any color can be combined by the red color, the green color and the blue color, the obtained brightness value is represented as the white color. If the calibration mechanism 1 is slid away from the scanning module 218 to keep a distance of 15 millimeters therebetween, the scanning module 218 can obtain the brightness value of the red color, the green color and the blue color respectively 26, 51, 51 which is represented as the gray color.

If the calibration mechanism 1 is slid away from the scanning module 218 to keep a distance of 18.75 millimeters therebetween, the scanning module 218 can obtain the brightness value of the red color, the green color and the blue color being respectively 12, 18, 20 which is represented as the black color.

As described above, if the calibration mechanism 1 is moved close to the scanning module 218, the scanning module 218 obtains great brightness value by scanning the calibration unit 10. Therefore, the calibration unit 10 of the calibration mechanism 1 is represented as the white sheet. If the calibration mechanism 1 is moved away from the scanning module 218, the scanning module 218 can obtain small brightness value by scanning the calibration unit 10. Therefore, the calibration unit 10 of the calibration mechanism 1 is represented as the gray sheet or the black sheet.

Therefore, the calibration mechanism 1 is capable of alternating the background color and the gray scale by adjusting the distance between the calibration mechanism 1 and the scanning module 218 for adjusting the shade value of the scanning module 218.

Furthermore, the present invention is not limited to the embodiments described above; diverse additions, alterations and the like may be made within the scope of the present invention by a person skilled in the art. For example, respective embodiments may be appropriately combined.

What is claimed is:

1. A calibration mechanism positioned in a scanning device having a scanning module defining a scanning line perpendicular to a scanned area of a document, comprising:
   a supporting unit;
   a calibration unit connected to the supporting unit, the calibration unit being positioned to face the scanning module and aligned with the scanning line; and
   a driving unit for driving the calibration unit to move close to the scanning module and away from the scanning module along the scanning line;
   wherein the driving unit comprises a sliding channel formed in a base of the scanning device and a sliding rib projected from the supporting unit for sliding in the sliding channel.

2. The calibration mechanism as claimed in claim 1, wherein a direction in which the sliding channel extends is parallel to the scanning line of the scanning module.

3. The calibration mechanism as claimed in claim 2, wherein the calibration unit is a white sheet.

4. A scanning device for scanning a document, comprising:
   a scanning module defining a scanning line substantially perpendicular to a scanned area of the document;
   a calibration unit positioned to face the scanning module and aligned with the scanning line;
   a supporting unit for supporting the calibration unit; and
   a driving unit for driving the calibration unit to move close to the scanning module and away from the scanning module along the scanning line;
   wherein the driving unit comprises a sliding channel formed in a base of the scanning device and a sliding rib projected from the supporting unit for sliding in the sliding channel.

5. The calibration mechanism as claimed in claim 4, wherein a direction in which the sliding channel extends is parallel to the scanning line of the scanning module.

6. The calibration mechanism as claimed in claim 5, wherein the calibration unit is a white sheet.

7. A scanning device for scanning a document, comprising:
   a base;
   an auto document feeder positioned on the base for conveying the document;
   a scanning module fixed in the auto document feeder and defining a scanning line substantially perpendicular to a scanned area of the conveyed document;
   a calibration unit positioned to face the scanning module and aligned with the scanning line;
   a supporting unit positioned in the base for supporting the calibration unit; and
   a driving unit positioned in the base for driving the calibration unit to move close to the scanning module and away from the scanning module along the scanning line;
   wherein the driving unit comprises a sliding channel formed in the base and a sliding rib projected from the supporting unit for sliding in the sliding channel.

8. The calibration mechanism as claimed in claim 7, wherein a direction in which the sliding channel extends is parallel to the scanning line of the scanning module.

9. The calibration mechanism as claimed in claim 8, wherein the calibration unit is a white sheet.

* * * * *